United States Patent
Gillemot et al.

[15] 3,654,584
[45] Apr. 4, 1972

[54] SERVICE LINE BRANCHOUT FACILITY FOR COMMUNICATION CABLES

[72] Inventors: George W. Gillemot, 2331 20th Street, Santa Monica, Calif. 90405; John T. Thompson, 244 Loring Street, Los Angeles, Calif. 90024

[22] Filed: Feb. 19, 1970

[21] Appl. No.: 12,821

[52] U.S. Cl..........................339/14 R, 339/95 R, 339/176 R
[51] Int. Cl.................................................H01r 3/06
[58] Field of Search..............339/14, 267, 269, 95, 97, 176, 339/177, 22–24; 174/51, 41, 78; 248/300

[56] References Cited

UNITED STATES PATENTS

| | | | |
|---|---|---|---|
| 2,891,101 | 6/1959 | Koliss | 174/59 |
| 3,128,979 | 4/1964 | Damelio | 248/25 |
| 3,144,500 | 8/1964 | Schreyer | 174/41 |
| 3,185,424 | 5/1965 | Sloop | 248/205 |
| 3,253,247 | 5/1966 | Vos | 339/95 |
| 3,435,126 | 3/1969 | Hamilton | 174/78 |
| 3,499,972 | 3/1970 | Smith | 174/88 |
| 3,461,220 | 8/1969 | Hukin | 174/48 |

*Primary Examiner*—Marvin A. Champion
*Assistant Examiner*—Robert A. Hafer
*Attorney*—Sellers and Brace

[57] ABSTRACT

A service line branchout facility for communication cables equipped with improved mechanical and electrical coupling means for rigidly interconnecting the cable sheath and shield to the adjacent end of the facility main frame. The coupling means are readily adaptive to widely varying conditions including a wide range of cable sizes and operating conditions affecting the spacing between the end of the cable sheath and the branchout facility. Wherever feasible the cable shield and sheath are clamped directly to the facility frame; if the sheath shrinks or is pulled away from the end of the facility, a metal adapter strip is interposed.

30 Claims, 5 Drawing Figures

PATENTED APR 4 1972  3,654,584

INVENTORS.
GEORGE W. GILLEMOT
JOHN T. THOMPSON
BY
ATTORNEYS

SERVICE LINE BRANCHOUT FACILITY FOR COMMUNICATION CABLES

Service line branchout facilities are employed to enclose an unsheathed length of a communication cable enclosing terminal board means useful in making a connection between a subscriber's service line and a selected pair of the cable conductors. The removal of the cable sheath and the underlying electrical shield layer to expose the conductors for a group of such service line connections necessitates taking appropriate countermeasures for severance of the sheath and shield. The removal of a short length of the sheath and of the electrical shield interferes with certain functions performed by both and designers of branchout facilities have proposed various expedients to counteract and compensate for the functions interfered with.

For example, prior branchout facilities have been provided with an elongated generally rectangular main frame equipped at its opposite ends with clamp means for gripping the respective ends of the severed cable sheath with the object of having this facility assume the tension load previously carried by the missing length of sheath. For this purpose, the upright transverse ends of the facility frame are usually provided with one or more two piece clamping rings the interior surfaces of which are corrugated to increase their gripping and clamping action against the adjacent end of the cable sheath. It follows that each branchout facility must be designed for use with a given cable size and tightening of the clamping means sufficiently to provide a firm grip with cable sheath necessarily compresses the conductors and risks severing the insulation between adjacent conductors.

Moreover, not infrequently the many adverse conditions affecting the cable causes the cable sheath to contract and withdraw from the clamp placing the conductors under heavy tension strain. Usually, it is extremely difficult and oftentimes impossible to restore the end of the sheath to its desired clamped position in the facility frame.

By the present invention there is provided simple, readily installed, highly reliable and effective means avoiding the foregoing and other limitations and objections to prior branchout facilities. The invention anchorage and electrical continuity means makes it possible to anchor cables of a range of sizes to the same branchout facility and its principles and basic components are usable equally effectively with both existing and newly manufactured branchout facilities. The new anchorage coupling is installable in lieu of the separable clamping member of existing main frame clamps. The substitute adapter plate is preferably provided with a multiplicity of holes in any one of which the clamping fastener of the cable sheath anchor assembly can be seated and clamped in place. The cable sheath anchor assembly comprises a pair of metal shoes between which the cable shield and sheath can be sandwiched using a threaded stud secured to one of the shoes and passing through the other shoe. If for any reason the anchor assembly secured to the cable sheath is displaced from the adapter plate a conductive adapter strip can be inserted and utilized to assume the load and to provide an electrical path between the frame and the cable shield.

Accordingly, it is a primary object of the present invention to provide a simple rugged, highly versatile method and means for coupling a cable sheath to the main frame of a branchout facility.

Another object of the invention is the provision of an improved method and coupling device for mechanically and electrically interconnecting an electrically shielded cable to a branchout facility.

Another object of the invention is the provision of an improved readily installed and adjusted means for interconnecting the severed ends of a cable sheath and shield to the adjacent ends of a branchout facility frame.

Another object of the invention is the provision of improved means for interconnecting the ends of an electrical shield and a cable sheath after a short length of sheath and shield have been removed and including provision for compensating for changes in the length of the gap in the cable sheath.

These and other more specific objects will appear upon reading the following specification and claims and upon considering in connection therewith the attached drawing to which they relate.

Referring now to the drawing in which a preferred embodiment of the invention is illustrated:

Figure 1:
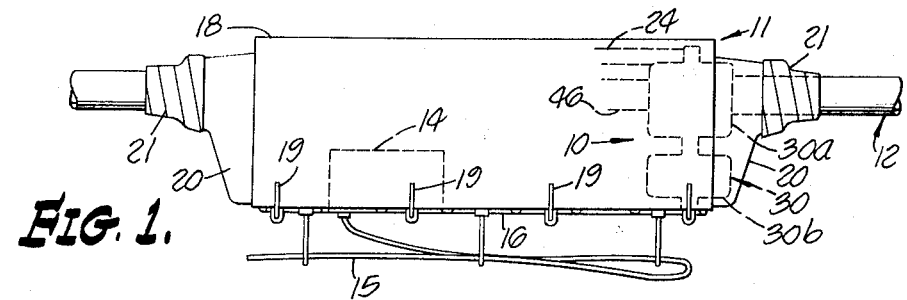
FIG. 1 is a side elevational view of a fully assembled cable branchout facility embodying the principles of this invention.

Referring initially and more particularly to FIG. 1, there is shown an illustrative embodiment of the invention, designated generally 10, assembled and enclosed by a service line branchout facility 11 about a telephone communication cable 12. Branchout facility 11 comprises an elongated housing enclosing a length of cable 12 from which a short length of the sheath has been removed to expose the conductor pairs in order that connections can be made between such pairs and one or more terminal boards 14 of well known construction and service line branchout leads 15 extending to a customer's telephone. Terminal boards 14 are suitably secured to the facility base member 16 and are enclosed within the removable inverted U-shaped housing member 18 mating with base member 16 and held detachably in place by U-shaped rotary spring clip members 19 straddling the underside of base 16. The opposite ends of housing 18 embrace and interlock with the larger end of boot members 20 having tapering outer ends snugly fitting about the cable and sealed thereto by tape servings 21. Access to the interior of facility 11 is provided by pivoting keeper clips 19 downwardly to the release position shown in FIG. 3 and lifting the U-shaped housing upwardly away from the cable.

Figure 2:
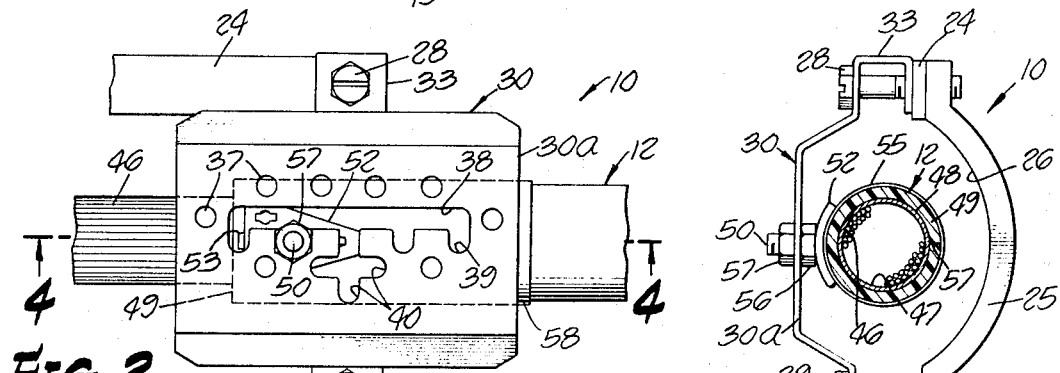
FIG. 2 is a side elevational view on an enlarged scale of the invention cable sheath clamping assembly at one end of the facility main frame.
Figure 3:
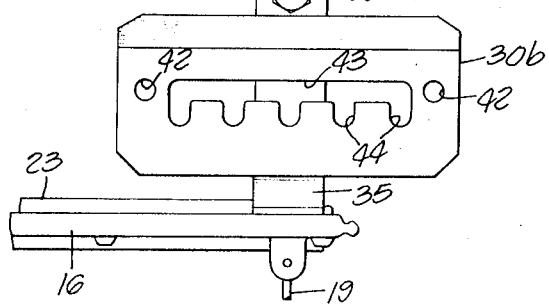
FIG. 3 is an end elevational view of the showing in FIG. 2.

Referring now more particularly to FIGS. 2 and 3, it is pointed out that facility 11 includes a suitable metallic main frame including a lower strip 23 suitably anchored by rivets 34 to base member 16, an upper metal strip 24, and a pair of upright bracket members 25 secured between the opposite ends of strips 23,24. Since both ends of the main frame are constructed similarly only one need be shown and described.

As herein shown, bracket 25 has a pair of concave clamping seats 26,27 of the type heretofore made for use with clamp members and accommodating cables of somewhat different diameters. It will be understood that each seat as heretofore manufactured and used, is normally provided with corrugations extending lengthwise of the seat and cooperating with similarly formed seats of a mating clamping member positioned along the left side of the cable as viewed in FIG. 3 and held in place by clamping bolts 28 and 29 which are tightened as necessary to clamp the cable securely to the upright brackets. The movable clamping members just referred to are not shown in the present drawing because they are discarded and replaced with the invention adapter plate 30.

Plate 30 is formed from heavy gauge sheet metal in the configuration shown in FIGS. 2 and 3 and is detachably secured to the fixed bracket member 25 by screws 28 and 29, its upper end being formed with an inverted U-shaped spacer portion 33 through which screw 28 passes. It will be noted that the upper main frame strap 24 is sandwiched between spacer 33 and the upper end of bracket 25 and that the lower frame strip 23 rigidly interconnects the base ends of brackets 25. The lower end 35 of adapter plate 30 merely bears against the base portion of brackets 25 in the manner best shown in FIG. 3. It will be understood that normally adapter plate 30 is detached only for the purpose of receiving cable 12, although it may be removed at any time if this is desirable for any reason.

As herein illustrated, bracket 25 can accommodate two cables entering from the right hand end of assembly 11. However, only one cable 12 is shown and it will be observed that this cable is considerably smaller in diameter than can be accommodated to illustrate the point that, when using the present invention, any of a considerable range of cable sizes can be equally accommodated by facility 11. Adapter plate 30 comprises two principal rectangular sections 30a,30b of generally channel shape to embrace the side of a cable opposite a companion curved portion of bracket 25. The flat web portion of the plate is formed with a plurality of holes 37 and a generally T-shaped slot 38 both the head and stem portion of which are formed with notches 39,40 having the same width and diameter as holes 37 and staggered between the latter. Portion 30b of plate 30 is likewise provided with openings 42 and slot 43 notched at 44 to receive the threaded shank of an anchor shoe assembly not shown, but anchorable to the cable sheath in the manner to be described below in connection with cable 12.

Figure 4:
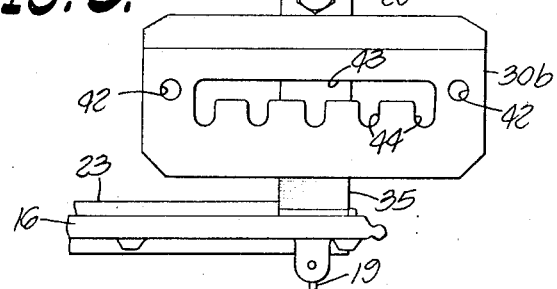
FIG. 4 is a fragmentary sectional view on an enlarged scale taken along line 4—4 on FIG. 2.

Referring now more particularly to FIGS. 3 and 4, it will be understood that cable 12 includes a plurality of pairs of insulated conductors 46 normally enclosed by a thin tubular layer of insulation 47 (FIG. 4), a surrounding electrically conductive shielding layer 48 of aluminium or the like and a tough thick impervious sheath 49 of insulating material. The anchor shoe assembly comprises a threaded stud 50 having its base end fixed to a metal shoe 51 (FIG. 4) of generally triangular shape in contour and arched crosswise in general conformity with the curvature of the inner surface of cable sheath 49. A second metallic shoe 52 of the same general configuration and curvature has an opening fitting loosely about threaded stud 50 and may be provided crosswise of its heel end with an upright tang 53. A thin resilient metal shim 54 is provided with perforations 55 having outwardly projecting low height burrs effective to penetrate a film of insulation sometimes present on the inner surface of the shielding layer 48. Shim 54 is sandwiched between inner shoe 51 and the interior surface of shielding layer 48 in the manner best shown in FIG. 4.

A preferred method of assembling the branchout facility 11 to cable 12 will now be described. The first step is to remove a length of the insulation sheath 49 from the cable for a distance somewhat less than the distance between the upright end brackets 25 of branchout facility 11 and typically illustrated in FIG. 2. The other end of the removed section of the sheath will be cut to terminate to the right of the corresponding upright bracket not shown but understood as present at the left hand end of facility 11. A similar length of the conductive shielding layer 48 and a somewhat shorter length of the insulation layer 47 will be removed.

To assembly the anchor stud 50 and shoes 51,52 to the cable sheath, both this sheath and the shielding layer 48 are slit lengthwise of the cable for a distance of several inches, as is indicated at 57 in FIG. 3. This permits the two sheath layers to be deflected or spread outwardly away from the cable. A hole or punchout 59 (FIG. 4) is bored or punched through layers 48,49 large enough to receive the threaded stud 50 and located on the side of the cable generally opposite slit 57. The thin flexible shim 54 and shoe 51 is then sandwiched against the interior surface of the electrical shield layer 48 with the burrs surrounding the rims of openings 55 puncturing any film on the shield layer. The sheath 49 is now compressed back against conductors 46 with the lateral edges of slit 57 compressed against one another and held in this position by a snug wrapping or serving of tape 58 coated with pressure sensitive adhesive. Thereafter, the outer shoe 52 is assembled over shank 50 and nut 56 is tightened to clamp shoes 51,52 against the intervening layers in the manner made clear by FIG. 4.

The other end of the severed cable sheath is similarly processed and equipped with an anchor stud 50 and a pair of shoes 51,52 clamped against the inner and outer surface layers 48,49 and 58 in the same manner as just described above. These operations are preferably performed while adapter plates 30 are detached and the cable is fully exposed.

The cable anchor studs 50 having been assembled and tightened, the next operation is to assemble the branchout facility 11 about the cable by placing the main frame of assembly 11 lengthwise of the far side of the cable following which the adapter plates are secured across the open side of brackets 25 using bolts 28,29 to hold the plates in place. During this assembly operation, studs 50 of the two anchor shoes are inserted in any selected one of the openings 37 or the notches 39. Normally these shoes are so assembled to the cable sheath as to permit the studs to be inserted near the inner lateral edges of plates 30 or reasonably close to the inner end, such as in the notch shown in FIG. 2. This is for the reason that the cable sheath tends to contract and pull away from assembly 11 under the action of various forces including wind, temperature changes, and the like prevailing factors. By selecting a hole closer to the inner lateral edge of plate 30 it is possible to relieve excess strain on the cable by later moving stud 50 to a different anchor hole. As soon as the studs have been assembled into a selected one of the holes a lock nut 57 is tightened over these studs to lock the anchor assembly to the main frame.

The multiplicity of holes and notches provided in the adapter plates provides simple wide range compensator means for adapting the cable sheath and the branchout facility to one another. As will be appreciated, it is a time consuming operation to install the two cable anchorage assemblies with the precision required for insertion into a single anchorage hole of the companion adapter plate. The provision of a multiplicity of holes staggered relative to one another provides wide latitude adjustability yet a firm and positive anchorage for the one opening found to provide the best fit.

Boots 20 are then assembled about the opposite ends of assembly 11 in the customary manner and sealed in place by the tape wrappings 21. The desired connections between selected pairs of the cable conductors 46, terminal block 14 and the branchout service line 15 are also made in the customary manner following which cover 18 is assembled over the main frame and clamped in place by pivoting the keeper springs 19 to the position shown in FIG. 1.

It will be appreciated from the foregoing description that the anchor assemblies provide not only a high strength mechanical anchorage bridging the gap between the ends of the cable sheath and across the exposed portion of the conductors but, in addition, electrical continuity between the shielding layers 48 to either end of the exposed portion of conductors 46. In this connection it will be recalled that the anchor assemblies have high pressure electrical contact with the associated shielding layers and are connected to a respective one of the adapter plates 30. These in turn are anchored by bolts 28 and 29 to brackets 25 which are interconnected between their upper and lower ends by the metal box 23,24. It is therefore clear that the same means providing the high strength mechanical connection also serves to form an electrical path for the shielding layers.

Figure 5:
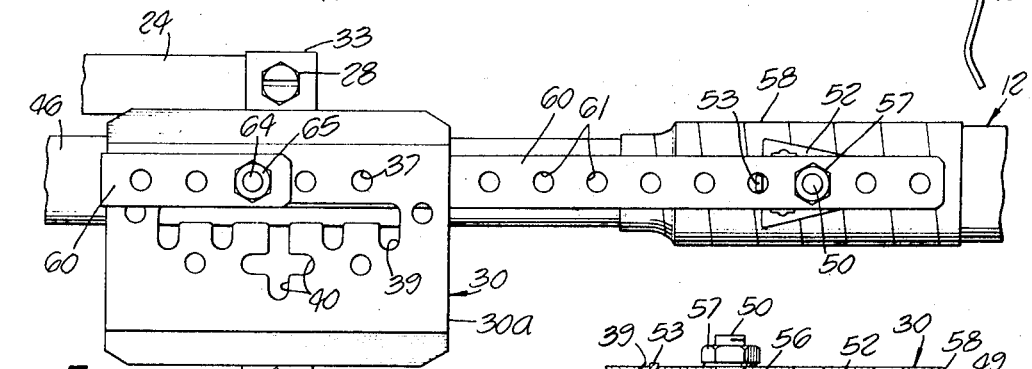
FIG. 5 is a view similar to FIG. 2 showing the cable sheath anchored to the adapter plate by a perforated metal adapter strip.

It sometimes happens that a cable sheath shrinks or becomes displaced along the conductors sufficiently that it is not possible to insert threaded stud 50 into any hole of plate 30. In this event, metal strip 60 formed with closely spaced holes 61 is assembled between a stud 50 and one of the openings 37, 39 or 40 of the adapter plate, a typical assembly of this type being illustrated in FIGS. 4 and 5. The strip is assembled over the stud and clamped in place by lock nut 57. The other end of the strip is then secured to plate 30, preferably in the manner shown in FIG. 5. The ductile metal strip is easily bent about the left hand edge of the adapter plate and clamped rigidly to this plate by bolt 64 and nut 65. The upturned tang 53 at the left hand end of outer clamping shoe 52 is positioned to extend into one of the openings 61 of strip 60 thereby strengthening the anchorage to the cable sheath and further safeguarding against rotation of the shoe about the stud.

It will be apparent from the foregoing that the metal strip 60 and its anchorage to the adapter plate provides the same high strength mechanical and electrical connection of the cable to the branchout facility 11 as the first described embodiment.

While the particular service line branchout facility for communication cables herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

We claim:

1. That improvement in a service line branchout facility for communication cables of the type having a conductive shield beneath the cable sheath which facility includes a rigid main frame to which the cable is anchorable and supporting terminal board means all enclosed within a protective enclosure, said improvement comprising: means including a threaded stud insertable through and clamped to punchout openings through the cable shield and sheath for detachably gripping and compressing the cable shield and sheath therebetween, electrically conductive means detachably connected to said main frame near one end thereof and having an opening therein for loosely accommodating said threaded stud, and means for holding said stud clamped to said last named means.

2. That improvement defined in claim 1 characterized in that said electrically conductive means comprises a metal adapter member located in a generally upright position at one end of said main frame and having threaded fastener means holding the same assembled to said main frame, and said adapter member having a plurality of openings therethrough in any one of which said electrically conductive means is clampable.

3. That improvement defined in claim 2 characterized in that said openings in said adapter member include an elongated slot with notches opening through one lateral edge thereof each adapted to seat the shank of fastener means for clamping said electrically conductive adapter member thereto.

4. That improvement defined in claim 3 characterized in that said slot extends lengthwise and generally parallel to said cable.

5. That improvement defined in claim 2 characterized in that said electrically conductive means includes a metal strip having a row of holes therealong one of which is clampable over said threaded stud and another of which can accommodate the shank of clamping bolt means securing said metal strip to said adapter member.

6. That improvement defined in claim 5 characterized in that said adapter member has a plurality of openings in any one of which the clamping bolt means for said metal strip is securable.

7. That improvement defined in claim 1 characterized in that said threaded stud means for gripping said cable sheath is clamped in firm electrical contact with a metallic shield surrounding the cable conductors and located immediately beneath the cable sheath.

8. That method of anchoring the sheath of a shielded multiple conductor cable to a service line branchout facility of the type having an elongated metallic main frame having a protective cover enclosing the frame and a terminal board means for making connections between cable conductors and one or more service lines, said method comprising removing a length of the cable sheath and electrical shield along a portion thereof to be enclosed within said branchout facility, slitting the cable sheath and shield lengthwise thereof adjacent at least one of the new-formed ends thereof, forming a hole through the sheath and shield generally opposite said slit, clamping the portion of said sheath and shield surrounding said hole between a pair of metal shoes by threaded stud means extending through said hole, and connecting said threaded stud to the main frame of said branchout facility by high strength electrically conductive means effective to hold the cable anchored thereto and said shield in electrically conductive relation therewith.

9. That method defined in claim 8 characterized in the step of serving the slit end of said cable sheath with multiple convolutions of tape to hold said sheath snugly in place about the underlying shield and electrical conductors in the area to either side of said threaded stud.

10. That method defined in claim 8 characterized in the steps of similarly anchoring both of the new-formed ends of the cable sheath to the adjacent end of said metallic main frame and utilizing said main frame as an electric path interconnecting the electric shields of the cable entering the opposite ends of said branchout facility.

11. That method defined in claim 8 characterized in the step of clamping said threaded stud means selectively directly to said main frame means or to a metal strip having a row of holes therealong depending on the location of said threaded stud means to said main frame means when these parts are in readiness for anchorage to one another, and using threaded fastener means to clamp said metal strip to said main frame means when the spacing between the threaded stud and the main frame means requires the use of said metal strip.

12. A service line branchout facility for use in connecting a main communication cable to one or more service lines, said facility having a horizontally disposed main frame provided at its ends with separate upright bracket means adapted to encircle a main cable extending therethrough, said bracket means including a rear member and a front plate-like adapter member spaced apart to accommodate at least one main cable passing therebetween, fastener means for clamping the end portions of said adapter member to said bracket means, said adapter member having a plurality of openings therein to receive fastener means, and fastener means separably attached thereto and securable to the sheath of said main cable and effective to anchor the cable sheath to a selected opening of said adapter member.

13. A branchout facility as defined in claim 12 characterized in that said adapter member is formed with a plurality of vertically and horizontally spaced openings any one of which may be used selectively in anchoring the cable sheath thereto.

14. A branchout facility as defined in claim 12 characterized in that said front adapter member includes means holding the same detachably secured to the rear member of said bracket means.

15. A branchout facility as defined in claim 14 characterized in that said front adapter member includes at least one elongated slot formed with notches spaced therealong each adapted for use in anchoring said fastener means therein.

16. A branchout facility as defined in claim 12 characterized in that said rear bracket member and said front adapter member are spaced apart sufficiently to receive cables of a range of diameters.

17. In a service line branchout splice facility for use in connecting a main communication cable to one or more service lines extending to a phone station, said branchout splice facility being of the type having an elongated metal main frame provided at its ends with separate upright metal bracket means and with a detachable jaw member cooperating with each thereof to clamp a main cable thereto and entering the opposite ends of said facility, wherein the improvement comprises: a converter adapter member detachably and rigidly securable to said bracket means in lieu of said jaw member with a broad rigid mid-portion thereof widely spaced from said bracket means, and adjustable means secured to the mid-portion of said adapter member for anchoring a cable sheath firmly thereto without need for compressing the cable against said bracket means.

18. The combination defined in claim 17 characterized in that said means for anchoring a cable to said adapter member includes anchor shoe means clampable to the cable sheath, and threaded fastener means for detachably connecting said anchor shoe means to said adapter member.

19. The combination defined in claim 18 characterized in the provision of an elongated strip formed with holes therealong one of which is clampable to said anchor shoe means and one of which is clampable to said adapter member by said threaded fastener means.

20. The combination defined in claim 18 characterized in that said threaded fastener means is part of said clamping shoe means and supports nut means for clamping said shoe means to the cable sheath, and separate nut means for clamping said shoe means and said cable to said adapter member.

21. The combination defined in claim 17 characterized in that said clamping shoe means and said adapter member are metallic and effective to provide a high capacity conductive path between the cable shielding jacket and said main frame, whereby the cable shields are electrically connected to one another when shielded cables are similarly anchored to adapter members at the opposite ends of said branchout facility.

22. The combination defined in claim 17 characterized in that said means in said adapter member for anchoring a cable sheath thereto includes a plurality of openings selectively usable to secure the cable sheath immovably to said adapter member.

23. The combination defined in claim 22 characterized in that certain of said openings are separate and distinct from one another.

24. The combination defined in claim 17 characterized in that certain of said openings are connected to one another via slot means along which anchoring fastener means is shiftable when not tightened.

25. The combination defined in claim 24 characterized in that said openings include notches opening laterally from common interconnecting slot means.

26. The combination defined in claim 17 characterized in that said adapter member is detachably from said bracket means while a cable remains firmly anchored to said adapter member.

27. The combination defined in claim 17 characterized in that said branchout facility is removable from a cable without disturbing the firm anchorage of a cable to said adapter member.

28. The combination defined in claim 18 characterized in that said anchor shoe means clamped to said cable sheath is located along one lateral side of the cable conductors.

29. The combination defined in claim 18 characterized in that the firm tightening of said anchor shoe means to the cable sheath is in effective to compress the cable conductors against one another or against said upright bracket means.

30. The combination defined in claim 29 characterized in that a single threaded shank is utilized to clamp said anchor shoe means to the cable and to said adapter member.

* * * * *